(12) United States Patent
Kopanski et al.

(10) Patent No.: US 10,647,420 B2
(45) Date of Patent: May 12, 2020

(54) AIRCRAFT ROTOR BLADE WITH REDUCED STRESS

(71) Applicant: Sikorsky Aircraft Corporation, Stratford, CT (US)

(72) Inventors: Krzysztof Kopanski, Trumbull, CT (US); Justin Thomas, New Haven, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 234 days.

(21) Appl. No.: 15/533,502

(22) PCT Filed: Oct. 15, 2015

(86) PCT No.: PCT/US2015/055719
§ 371 (c)(1),
(2) Date: Jun. 6, 2017

(87) PCT Pub. No.: WO2016/108997
PCT Pub. Date: Jul. 7, 2016

(65) Prior Publication Data
US 2017/0334554 A1    Nov. 23, 2017

Related U.S. Application Data

(60) Provisional application No. 62/094,153, filed on Dec. 19, 2014.

(51) Int. Cl.
*B64C 27/06* (2006.01)
*B64C 27/473* (2006.01)
*B64C 27/00* (2006.01)

(52) U.S. Cl.
CPC .......... *B64C 27/473* (2013.01); *B64C 27/008* (2013.01); *B64C 27/06* (2013.01); *B64C 2027/4736* (2013.01)

(58) Field of Classification Search
CPC ..... B64C 27/46; B64C 27/473; B64C 27/008; B64C 27/04; B64C 27/06; B64C 27/08;
(Continued)

(56) References Cited

U.S. PATENT DOCUMENTS 5,813,625 A    9/1998  Hassan et al.
6,203,269 B1 *  3/2001  Lorber ................. B64C 11/18
                                                244/207
(Continued)

OTHER PUBLICATIONS

Meguid, S.A.; "Finite Element Analysis of Defence Hole Systems for the Reduction of Stress Concentration in a Uniaxially-loaded Plate with Two Coaxial Holes"; Engineering Fracture Mechanics vol. 25, No. 4, pp. 403-413, 1986.
(Continued)

*Primary Examiner* — Richard A Edgar
*Assistant Examiner* — Maxime M Adjagbe
(74) *Attorney, Agent, or Firm* — Cantor Colburn LLP

(57) ABSTRACT

An aircraft rotor blade includes a surface of the rotor blade, at least one main hole that extends through the surface and has a width and a length, and at least one leader hole that extends through the surface and has a length that is less than the length of the main hole and arranged spaced from and adjacent the main hole. The leader hole gradually increases in width from a first end of the leader hole opposite the main hole to an opposed second end of the leader hole proximate the main hole to operatively gradually distribute stress in the leader and main holes and rotor blade and reduce an amount of the stress exerted therein.

12 Claims, 3 Drawing Sheets

(58) Field of Classification Search
CPC . B64C 27/10; B64C 2027/4736; F01D 5/147;
F01D 5/182; F01D 5/183; F01D 5/186;
F01D 5/187; F03D 1/0675; F03D 1/0633;
F03D 1/0641
See application file for complete search history.

(56) References Cited

U.S. PATENT DOCUMENTS

| | | |
|---|---|---|
| 7,097,427 B2 | 8/2006 | Kuhns et al. |
| 8,052,378 B2 * | 11/2011 | Draper ............... F01D 5/186 415/115 |
| 8,066,482 B2 | 11/2011 | Strohl et al. |
| 2005/0254947 A1 | 11/2005 | Loftus et al. |
| 2013/0280091 A1 * | 10/2013 | Propheter-Hinckley ............... B22C 9/10 416/97 A |

OTHER PUBLICATIONS

Notification of Transmittal of the International Search Report of the International Searching Authority, or the Declaration; International Application No. PCT/US2015/55719; International Filing Date: Oct. 15, 2015; dated Jun. 20, 2016; pp. 1-9.
PCT Written Opinon of the International Searching Authority; International Application No. PCT/US2015/55719; International Filing Date: Oct. 15, 2015; dated Jun. 20, 2016; pp. 1-4.
Ukadgaonker, et al.; "A general solution for stress around holes in symmetric laminates under inplane loading"; Composite Structures 49 (2000) pp. 339-354.

* cited by examiner

US 10,647,420 B2

AIRCRAFT ROTOR BLADE WITH REDUCED STRESS

CROSS REFERENCE TO RELATED APPLICATIONS

This application is a National Stage application of PCT/US2015/055719, filed Oct. 15, 2015, which claims the benefit of U.S. Provisional Application No. 62/094,153, filed Dec. 19, 2014, both of which are incorporated by reference in their entirety herein.

STATEMENT REGARDING FEDERALLY SPONSORED RESEARCH OR DEVELOPMENT

This invention was made with Government support under FA8650-13-C-7304 awarded by the Department of the Air Force. The Government has certain rights in this invention.

BACKGROUND OF INVENTION

This invention relates generally to a rotor system of a rotary-wing aircraft and, more specifically, to a rotor blade for such aircraft.

A conventional rotary-wing aircraft, such as a helicopter, includes a rotor hub configured to rotate about an axis and having multiple rotor-blade assemblies mounted thereto. Each rotor-blade assembly includes a blade that extends outwardly from the rotor hub.

A large number of slots, holes, or other openings may be formed (e.g., by drilling) in an upper surface of the blade at spaced locations corresponding to desired locations of inserts in the upper surface. The upper surface can be made of a carbon-fiber composite.

BRIEF DESCRIPTION OF INVENTION

According to a non-limiting exemplary embodiment of the invention, an aircraft rotor blade is provided. The rotor blade includes a surface of the rotor blade, at least one main hole that extends through the surface and has a width and a length, and at least one leader hole that extends through the surface and has a length that is less than the length of the main hole and arranged spaced from and adjacent the main hole. The leader hole gradually increases in width from a first end of the leader hole opposite the main hole to an opposed second end of the leader hole proximate the main hole to operatively gradually distribute stress in the leader and main holes and rotor blade and reduce an amount of the stress exerted therein.

In addition to one or more of the features described above or below or as an alternative, further embodiments can include the leader hole being of a shape that is different than that of the main hole.

In addition to one or more of the features described above or below or as an alternative, further embodiments can include the first and second ends of the leader hole being substantially arcuate, sides of the leader hole being either linear or arcuate, and the main hole being a complex curve defining arcuate ends and sides of the main hole.

In addition to one or more of the features described above or below or as an alternative, further embodiments can include the sides of the leader hole gradually diverging from each other away from the first end and toward the second end of the leader hole and being disposed non-parallel with each other.

In addition to one or more of the features described above or below or as an alternative, further embodiments can include the first end of the leader hole defining a radius of curvature that is smaller than that of the second end of the leader hole.

In addition to one or more of the features described above or below or as an alternative, further embodiments can include the radius of curvature of the second end of the leader hole being substantially equal to a radius of curvature of an end of the adjacent main hole proximate the second end of the leader hole.

In addition to one or more of the features described above or below or as an alternative, further embodiments can include the main and leader holes being arranged generally adjacent a leading edge of the surface of the rotor blade.

In addition to one or more of the features described above or below or as an alternative, further embodiments can include the first end of the leader hole being directed toward an inboard end of the rotor blade and the main hole being arranged adjacent the leader hole opposite the inboard end.

In addition to one or more of the features described above or below or as an alternative, further embodiments can include the first end of the leader hole being directed toward a tip of the rotor blade and the main hole being arranged adjacent the leader hole opposite the tip.

In addition to one or more of the features described above or below or as an alternative, further embodiments can include the rotor blade including a pair of leader holes arranged on respective opposed ends of the main hole, the first end of one of the leader holes being directed toward an inboard end of the rotor blade, and the first end of the other of the leader holes being directed toward a tip of the rotor blade.

In addition to one or more of the features described above or below or as an alternative, further embodiments can include the rotor blade including a string of a plurality of spaced main holes that are substantially identical and aligned with respect to each other and the leader hole being aligned with the main holes.

In addition to one or more of the features described above or below or as an alternative, further embodiments can include the first end of the leader hole being directed toward an inboard end of the rotor blade and the string of main holes being arranged adjacent the leader hole opposite the inboard end.

In addition to one or more of the features described above or below or as an alternative, further embodiments can include the first end of the leader hole being directed toward a tip of the rotor blade and the string of main holes being arranged adjacent the leader hole opposite the tip.

In addition to one or more of the features described above or below or as an alternative, further embodiments can include the rotor blade including a pair of leader holes arranged on respective opposed ends of the string of main holes, the first end of one of the leader holes being directed toward an inboard end of the rotor blade, and the first end of the other of the leader holes being directed toward a tip of the rotor blade.

In addition to one or more of the features described above or below or as an alternative, further embodiments can include the rotor blade including a string of a plurality of spaced leader holes respective sizes of which gradually progressively increase from a first leader hole to a last leader hole of the string.

BRIEF DESCRIPTION OF DRAWING

The patent or application file contains at least one figure of the drawing thereof executed in color. Copies of this patent or patent-application publication with the color figure(s) will be provided by the Office upon request and payment of the necessary fee.

The subject matter that is regarded as the invention is particularly pointed out and distinctly claimed in the claims at the conclusion of the specification. The foregoing and other features and advantages of the invention are apparent from the following detailed description taken in conjunction with the accompanying drawing in which:

DETAILED DESCRIPTION OF INVENTION

Referring to the figures, a non-limiting exemplary embodiment of a rotary-wing aircraft with which the invention can be implemented is generally indicated at 10. Although the aircraft 10 disclosed herein is a helicopter 10, it is understood that the aircraft 10 can be any suitable type of aircraft or machine. For example, a high-speed-compound rotary-wing aircraft with supplemental translational-thrust systems, a dual contra-rotating co-axial rotor-system aircraft, turboprops, tilt-rotors, and a tilt-wing aircraft can benefit from the invention. Furthermore, although the invention is disclosed herein as being implemented with main rotor blades or tail-rotor blades having "Retreating Side Blowing" (hereinafter referred to as merely "RSB") technology, it is understood that the invention can be implemented with any suitable technology that requires openings in a blade, such as those used for weight cups for holding weights to balance rotor blades. In addition, it is understood that the invention can be implemented with any other airfoil-type blade, such as a stationary or wind vane, wind-turbine blade, or propeller blade on fixed-wing aircraft. Moreover, it is understood that the invention can be applied just the same to, in general, any suitable beam under load having holes.

Figure 1:
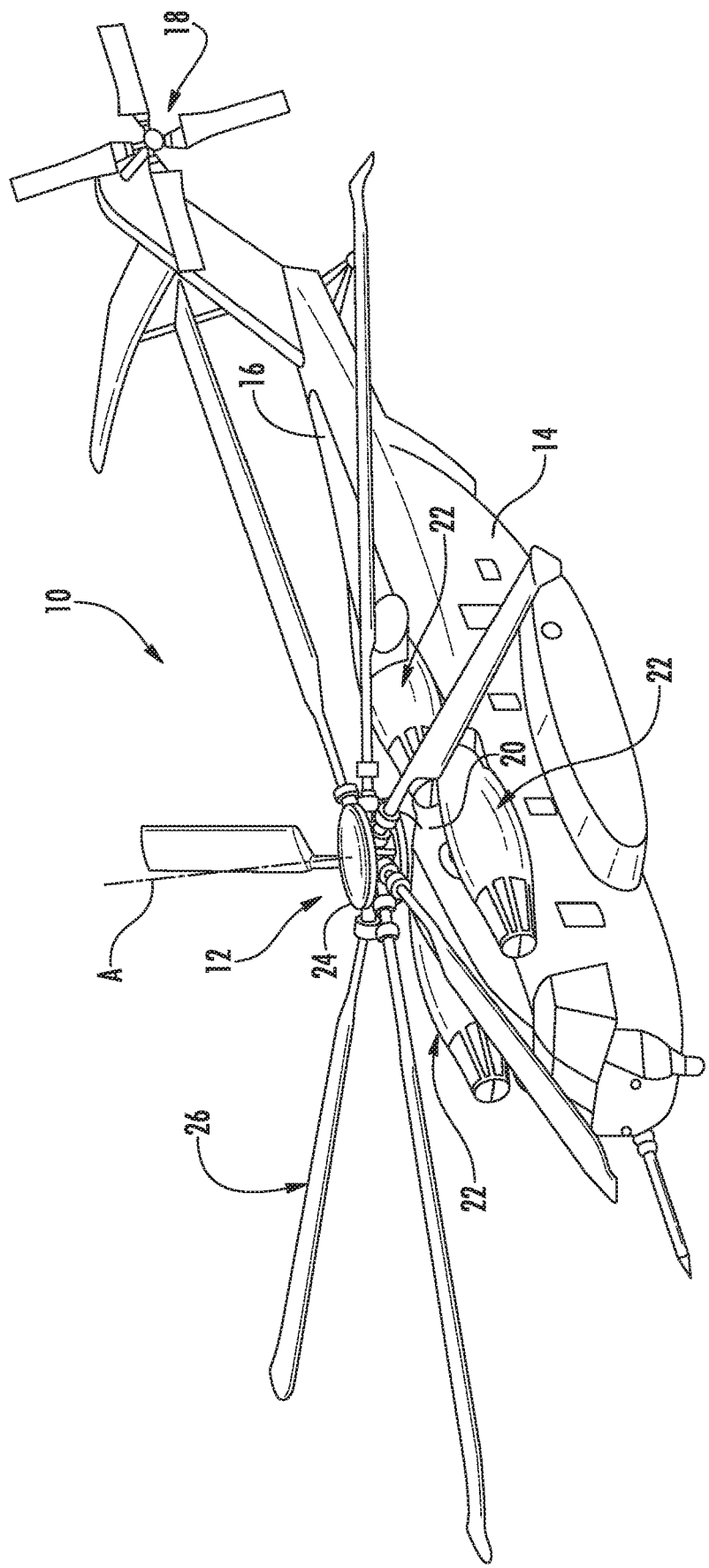
FIG. 1 is a perspective view of a non-limiting exemplary embodiment of a rotary-wing aircraft with which the invention can be implemented.

Referring specifically to FIG. 1, the aircraft 10 includes a main rotor system 12 and an airframe 14 having an extending tail 16 that mounts a tail-rotor system 18 as an anti-torque system. The main rotor system 12 is driven about an axis of rotation A through a main gearbox 20 by at least one engine 22 (three shown in the figure). The main rotor system 12 also includes a rotor hub 24 having a plurality of rotor blades, generally indicated at 26 (seven shown in the figure), mounted to and projecting radially outwardly from the rotor hub 24. The blades 26 may be made of a composite material.

It is understood that the helicopter 10 can have any suitable configuration. It is also understood that the contour and cross-section (in size and shape) of the blade 26 may vary over the length of the blade 26. It is also understood that the blade 26 may be formed using known design and manufacturing processes.

Figure 2:
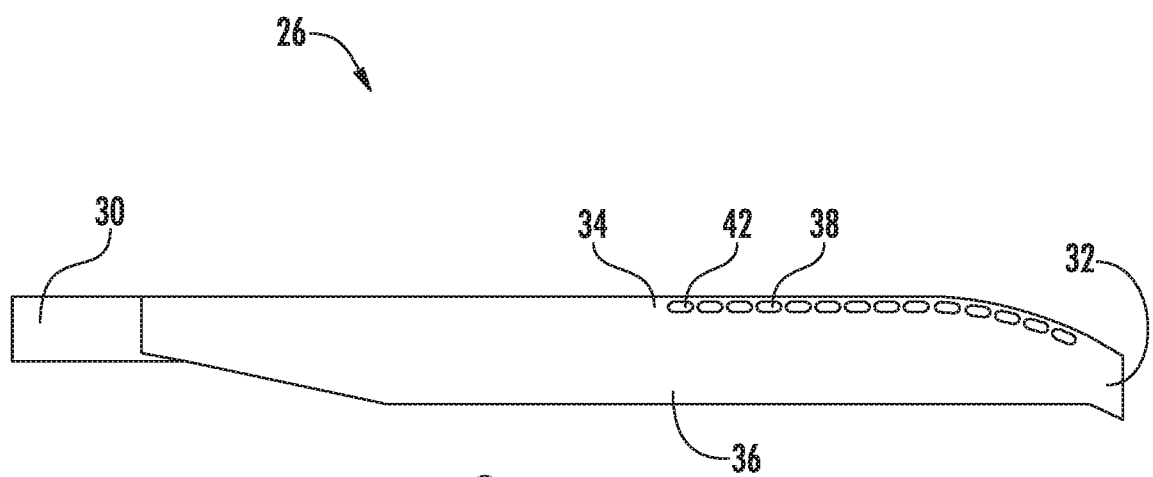
FIG. 2 is a top view of a rotor blade of the rotary-wing aircraft illustrated in FIG. 1 according to a non-limiting exemplary embodiment of the invention.

Referring specifically to FIG. 2, each blade 26 is configured to be coupled to the rotor hub 24 at an inboard end 30 of the blade 26 disposed opposite a tip 32 of the blade 26. It is understood that the inboard end 30 and tip 32 can define any suitable geometry. The blade 26 defines an upper surface 34 of the blade 16 and a lower surface 36 of the blade 26 opposite the upper surface 34. In an aspect, the blade 26 is made of a carbon-fiber composite.

The upper surface 34 also includes at least one main hole 38. The main hole 38 can be an RSB main slot shaped to receive a blower (not shown), where the upper surface of the blower generally conforms to the outer mold line of the blade 26 and, thus, substantially completes the aerodynamic shape of the blade extending entirely or partially through the upper surface 34. In an aspect, the main hole 38 is arranged generally adjacent a leading edge of the upper surface 34 (and, thus, blade 26) such that part of the upper surface 34 is between the main hole 38 and the leading edge of the blade 26. The shown main hole 38 is substantially oval, having a complex curve defining arcuate ends and sides of the main hole 38. However, it is understood that the main hole 38 can have other shapes in other aspects, including circular shapes.

The upper surface 34 of the blade 26 may include a string of spaced main holes 38. The main holes 38 may be identical (i.e., of same size and shape) or substantially identical and aligned with respect to each other such that the string is parallel with the leading edge of the blade 26 for the entire length of the string. For the entire length of the string, spacing between corresponding adjacent main holes 38 is uniform, and the length of the spacing is no greater than the chordal length of an end of any main hole 38. In the shown example, the length of the spacing is substantially shorter than such chordal length, and the string consists of thirteen main holes 38.

Each of the main holes 38 can be of any suitable shape and size, which generally depends upon the properties of the material of which the upper surface 34 is made. For example, each main hole 38 can be shaped as a "racetrack" defining arcuate ends and substantially linear sides of the main hole 38. It is also understood that each of the main holes 38 can have any suitable relationship with any of the other main hole(s) 38, upper surface 34, and remainder of the blade 26. It is also understood that the string can consist of any suitable number of main holes 38, define any suitable length, and have any suitable relationship with the upper surface 34 and remainder of the blade 26. Spacings between the corresponding adjacent main holes 38 can be non-uniform and of any suitable distance.

Figure 3:
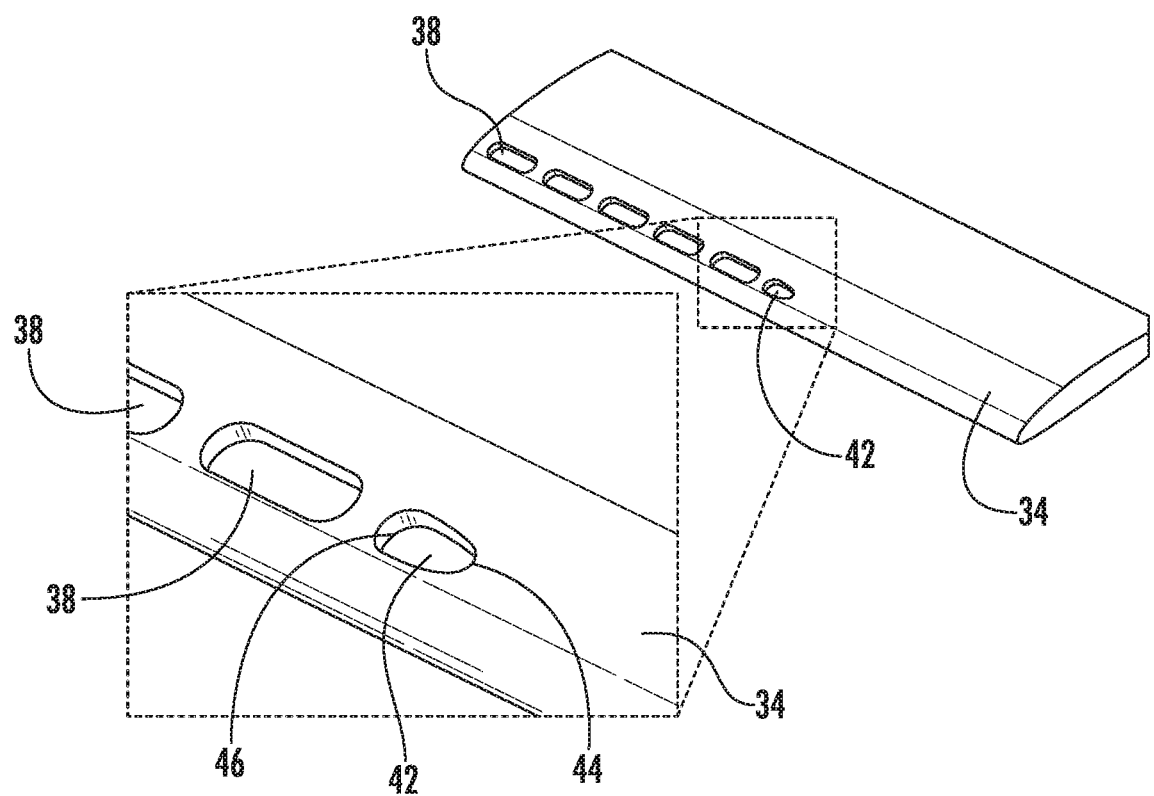
FIG. 3 is an exploded view of a portion of the rotor blade illustrated in FIG. 2.

Referring specifically to FIGS. 2 and 3, the upper surface 34 of the blade 26 includes also at least one specifically shaped and sized leader hole 42 or 43 extending entirely or partially through the upper surface 34. The leader hole 42 is arranged spaced from and adjacent the main hole 38 or string of main holes 38. The leader hole 42 gradually increases in size from a first end 44 of the leader hole 42 farthest from the main hole 38 or string of main holes 38 to an opposed second end 46 of the leader hole 42 proximate the main hole 38 or string of main holes 38. As shown, a width of the leader hole 42 closest to the main hole 38 is substantially a width of the main hole 38. In this way, each leader hole 42 has an egg shape that acts as a stress-reducing opening for blade surfaces 34 proximate the main holes 38. The leader hole(s) 42 may be smaller in size, lengthwise, than the main hole(s) 38. Leader hole(s) 42 are positioned proximate the leading edge of the blade 26. Part of the upper surface 34 is located between the leader hole 42 and the leading edge of the blade 26.

The leader hole 42 can be arranged on either end of the main hole 38 or string of main holes 38. Alternatively and referring specifically to FIGS. 4B and 4C, the upper surface 34 can include a pair of leader holes 42, 43 arranged on the respective opposed ends of the main hole 38 or string of main holes 38. The leader holes 42 of FIG. 4B are shaped differently than the leader holes 43 of FIG. 4C (and FIG. 5), which shapes are described in more detail below. In any of these cases, the second end 46 of the leader hole 42, 43 is disposed proximate the main hole 38 or string of main holes 38, and the first end 44 of the leader hole 42, 43 is disposed opposite the main hole 38 or string of main holes 38.

More specifically, in an aspect and as shown in FIGS. 2 and 3, the leader hole 42 is arranged nearer the inboard end 30 of the blade 26 (as opposed to the tip 32 of the blade 26) and adjacent an inboard end of the main hole(s) 38. As such, compared to the main hole(s) 38, the leader hole 42 is arranged farther from the tip 32 of the blade 26. In another aspect, the leader hole 42 can be arranged nearer the tip 32 of the blade 26 and adjacent a tip end of the main hole(s) 38. As such, compared to the main hole(s) 38, the leader hole 42 can be arranged farther from the inboard end 30 of the blade 26. In even another aspect, leader holes 42 can be arranged on the respective ends of the main hole 38 or string of main holes 38. In this way, one leader hole 42 is arranged nearer the inboard end 30 of the blade 26 and adjacent an inboard end of the main hole 38 or string of main hole(s) 38, and another leader hole 42 is arranged nearer the tip 32 of the blade 26 and adjacent a tip end of the main hole 38 or string of main holes 38.

Figure 4A:
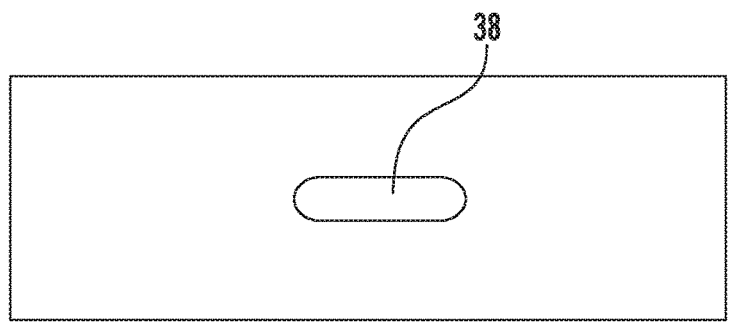
FIGS. 4A-4C show a comparison of stress of a main hole and at least one leader hole of a rotor blade according to other respective non-limiting exemplary embodiments of the invention.
Figure 4B:
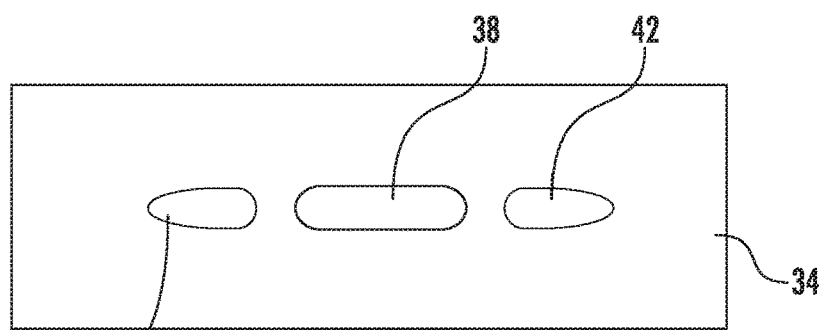
Figure 4C:
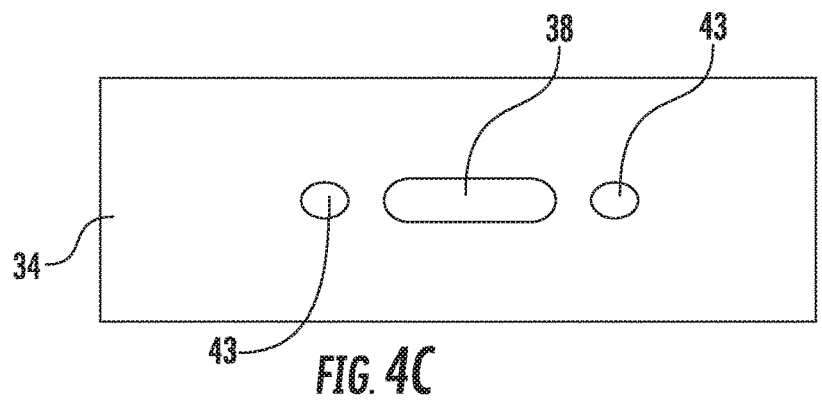
Figure 5:
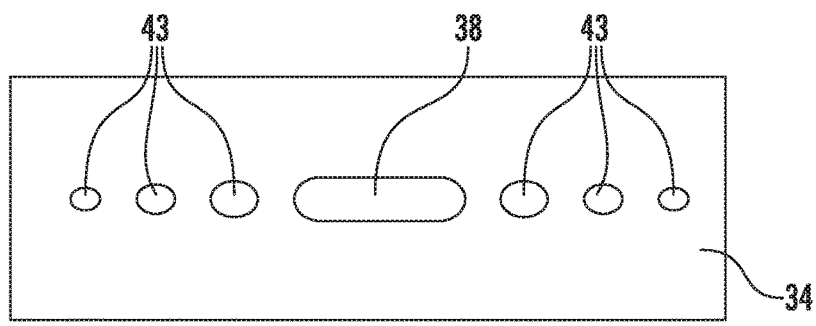
FIG. 5 shows a rotor blade according to another non-limiting exemplary embodiment of the invention.

In aspects, the leader hole 42 is generally arrowhead-shaped (FIGS. 3 and 4B), or the leader hole 43 is generally circular or egg-shaped (i.e., complex-shaped) (FIGS. 4C and 5). The first and second ends 44, 46 are arcuate and the first and second ends 44, 46 are connected to each other by either linear or gradually arcuate sides (i.e., complex curve). More specifically, in FIGS. 3 and 4B, the first end 44 of the leader hole 42 is directed toward (i.e., "points to") the inboard end of the blade 26 and defines a radius of curvature that is smaller (i.e., tighter radius) than that of the second end of the leader hole 42. In this way, the sides of the leader hole 42 gradually diverge from each other away from the first end and toward the second end of the leader hole 42 such that the sides of the leader hole 42 are disposed non-parallel with each other. Also, the radius of curvature of the second end of the leader hole 42 is equal or substantially equal to that of the inboard end of the adjacent or first main hole 38.

The leader hole 42 is part of the string of spaced holes 38, 42. More specifically, the leader hole 42 is aligned with the main holes 38 such that an imaginary line runs through foci of the leader hole 42 and those of each of the main holes 38. Also, the top sides and bottom sides of the corresponding main holes 38 form respective imaginary lines that are substantially parallel with each other, and the sides of the leader hole 42 lie at or within these parallel lines. Spacing between the leader hole 42 and first main hole 38 is equal or substantially equal to the spacings between the corresponding adjacent main holes 38. In the figure, such spacing is equal or substantially equal to the chordal length of the second end of the leader hole 42 and inboard end of the first main hole 38.

It is understood that the leader hole 42 can be of any suitable specific shape and size, which generally depends upon the properties of the material of which the upper surface 34 of the blade 26 is made. It is also understood that the leader hole 42 can have any suitable relationship with the main hole(s) 38, upper surface 34, and remainder of the blade 26. It is also understood that the spacing between the leader hole 42 and first main hole 38 can vary from the spacings between the corresponding adjacent main holes 38 and be of any suitable distance.

Referring specifically to FIG. 5, in another aspect, the upper surface 34 of the blade 26 can define at least one string of a plurality of spaced leader holes 43. In this aspect, the respective sizes of the leader holes 43 gradually progressively increase from a first leader hole 43 to a last leader hole 43. In the illustrated example, a pair of strings of leader holes 43 are defined on respective opposite sides of a main hole 38 such that the leader holes 43 gradually progressively increase in size from left to right on the left side of the main hole 38 and from right to left on the right side of the main hole 38. Also, although the respective sizes of the leader holes 43 are shown variable with respect to each other, the respective shapes of the leader holes 43 are shown uniform with respect to each other and the spacings between corresponding adjacent leader holes 43 are uniform. Furthermore, each string of leader holes 43 is adjacent a main hole 38. However, it is understood that the respective shapes of the leader holes 43 can be variable with respect to each other and the spacings between corresponding adjacent leader holes 43 can be variable with respect to each other. It is also understood that any suitable number of main holes 38 can be situated between a pair of leader holes 43 or pair of strings of leader holes 43.

The main and leader holes 38, 42 are each configured to matingly receive and bind an insert (not shown) to the upper surface 34 of the blade 26. In an aspect, the insert can be hollow and metallic and define a cooling-fluid passage therein. In this aspect, the inserts are inserted into and bonded to the upper surface 34 such that the upper surface 34 is secured against displacement from the insert. More specifically, each of the main and leader holes 38, 42 defines an inner surface of the upper surface 34 on which an outer surface of the corresponding insert forms a high-strength bond to secure the blade 26 to the insert. An extremely large force should be required to pull the inserts out of the main and leader holes 38, 42 and, thus, upper surface 34.

It is understood that each insert can be any suitable type of insert, made of any suitable material, and bonded to the upper surface 34 of the blade 26 in any suitable manner. It is also understood that the insert can have any suitable shape and size and relationship with the corresponding main or leader hole 38, 42 and, hence, upper surface 34. It is also understood that the insert can be pulled out of the main and leader holes 38, 42 and, thus, upper surface 34 in any suitable manner.

In operation, use of the leader hole 42 ahead of the main hole(s) 38 allows for a more gradual distribution of strain or stress in the main and leader holes 38, 42 and, thus, blade 26. This distribution, in turn, reduces or relieves the amount of stress exerted on the main and leader holes 38, 42 and blade 26. Such strain/stress can take the form of static or vibratory (fatigue) span-wise strain. The leader hole 42 defines a lower amount of stress than the main hole(s) 38 because the leader hole 42 is smaller and of a more gradual shape than is the main hole(s) 38. Presence of the leader hole 42 ahead of the main hole(s) 38 distributes the stress in a more controlled fashion such that a collective amount of the stress of the main hole(s) 38 is lower than it would otherwise be without the leader hole 42.

FIGS. 4A through 4C show results from a computer model demonstrating the effect of the use of leader holes 42, 43 where a blade 26 undergoes a common load. As shown in FIG. 4A, the main hole 38 experiences a strain of 910

μin/in without any holes being adjacent. In FIG. 4B, the leader hole 42 is disposed adjacent to the main hole 38 where the leader hole 42 has an arrow or egg shape according to aspects of the invention. In FIG. 4C, a hole 43 is disposed adjacent the main hole 38, where the hole 43 is circular. As shown in FIG. 4C, using the circular hole 43, the main hole 38 experiences a reduced strain of 793 μin/in, but the hole 43 experiences a very high strain of 1156 μin/in. In contrast, as shown in FIG. 4B, the leader hole 38 experiences a lower strain of 857 μin/in, and the main hole 38 experiences the lowest strain (761 μin/in) of any of the three configurations shown in FIGS. 4A through 4C. As such, the use of the shaped leader hole 42 according to aspects of the invention lowers the strain and stress of the main hole 38 while also reducing the strain and stress at the leader hole 42 as compared to the use of circular holes 43.

To create the main and leader holes 38, 42, material is removed from the upper surface 34 of the blade 26 as necessary—such as by machining. However, it is understood that the material can be removed from the upper surface 34 in any suitable manner. The leader hole 42 has a specific shape to minimize stress concentration of the leader hole 42 and, in turn, main hole(s) 38 and blade 26. By way of example, the leader hole 42 can be made by cutting a hole with a small diameter, cutting a second hole having a diameter substantially the same as the width of the adjacent main hole 38, and hollowing out the portions in-between. The main and leader holes 38, 42 must be large enough such that the corresponding inserts may be inserted through the main and leader holes 38, 42 and bonded to the upper surface 34 to secure the inserts to the upper surface 34.

While the invention has been described in detail in connection with only a limited number of embodiments, it is understood that the invention is not limited to such disclosed embodiments. Rather, the invention can be modified to incorporate any number of variations, alterations, substitutions, or equivalent arrangements not heretofore described, but which are commensurate with the spirit and scope of the invention. Additionally, while various non-limiting embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A rotor blade comprising:
   a surface of the rotor blade;
   at least one main hole that extends through the surface and has a width and a length; and
   at least one leader hole that extends through the surface and has a length that is less than the length of the at least one main hole and is arranged spaced from and adjacent to the at least one main hole, the at least one leader hole gradually increasing in width from a first end of the at least one leader hole opposite the at least one main hole to an opposed second end of the at least one leader hole proximate the at least one main hole, the at least one main hole and the at least one leader hole forming a single linear row that extends substantially parallel to a leading edge of the rotor blade from an inboard end of the rotor blade to an outboard end of the rotor blade,
   wherein the first end of the at least one leader hole is directed toward a tip of the rotor blade and the at least one main hole is arranged adjacent the at least one leader hole opposite the tip.

2. The rotor blade according to claim 1, wherein the at least one leader hole is of a shape that is different than that of the at least one main hole.

3. The rotor blade according to claim 2, wherein the first and second ends of the at least one leader hole are arcuate, sides of the at least one leader hole are either linear or arcuate, and the at least one main hole has a curve defining arcuate ends and sides of the at least one main hole.

4. The rotor blade according to claim 3, wherein the sides of the at least one leader hole gradually diverge from each other away from the first end and toward the second end of the at least one leader hole and are disposed non-parallel with each other.

5. The rotor blade according to claim 1, wherein the first end of the at least one leader hole defines a radius of curvature that is smaller than that of the second end of the at least one leader hole.

6. The rotor blade according to claim 5, wherein the radius of curvature of the second end of the at least one leader hole is equal to a radius of curvature of an end of the adjacent at least one main hole proximate the second end of the at least one leader hole.

7. The rotor blade according to claim 1, wherein the at least one main hole and the at least one leader hole are arranged generally adjacent the leading edge of the surface of the rotor blade.

8. The rotor blade according to claim 1, wherein the rotor blade comprises a pair of leader holes arranged on respective opposed ends of the at least one main hole, the first end of one of the leader holes being directed toward an inboard end of the rotor blade and the first end of the other of the leader holes being directed toward the tip of the rotor blade, wherein the pair of leader holes includes the at least one leader hole.

9. The rotor blade according to claim 1, wherein the rotor blade comprises a string of a plurality of spaced main holes that are identical and aligned with respect to each other and the at least one leader hole is aligned with the main holes, and wherein the string of the plurality of spaced main holes includes the at least one main hole.

10. The rotor blade according to claim 9, wherein the string of main holes is arranged adjacent the at least one leader hole opposite the tip.

11. The rotor blade according to claim 1, wherein the rotor blade comprises a pair of leader holes arranged on respective opposed ends of a string of main holes, the first end of one of the leader holes being directed toward an inboard end of the rotor blade and the first end of the other of the leader holes being directed toward the tip of the rotor blade, wherein the pair of leader holes includes the at least one leader hole and the string of main holes includes the at least one main hole.

12. The rotor blade according to claim 1, wherein the rotor blade comprises a string of a plurality of spaced leader holes respective sizes of which gradually progressively increase from a first leader hole to a last leader hole of the string, wherein the string of spaced leader holes includes the at least one leader hole.

* * * * *